Figure 1:
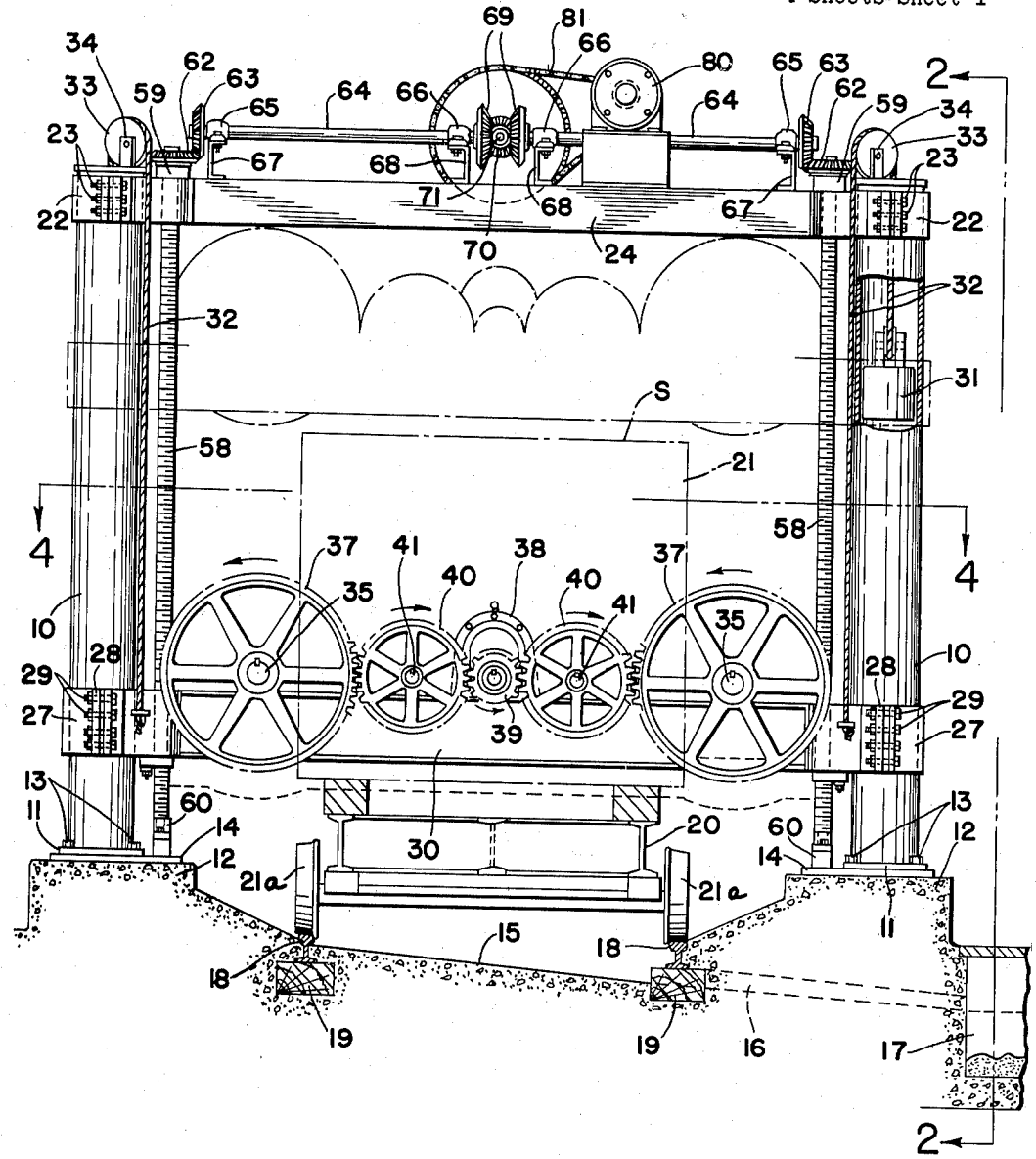

INVENTOR.
HAROLD T. BLUM
ATTORNEYS

Oct. 11, 1955    H. T. BLUM    2,720,200
GANG SAW MACHINE FOR CUTTING STONE
Filed Dec. 20, 1954    4 Sheets-Sheet 3

INVENTOR.
HAROLD T. BLUM
BY
Freaw + Bisley
ATTORNEYS

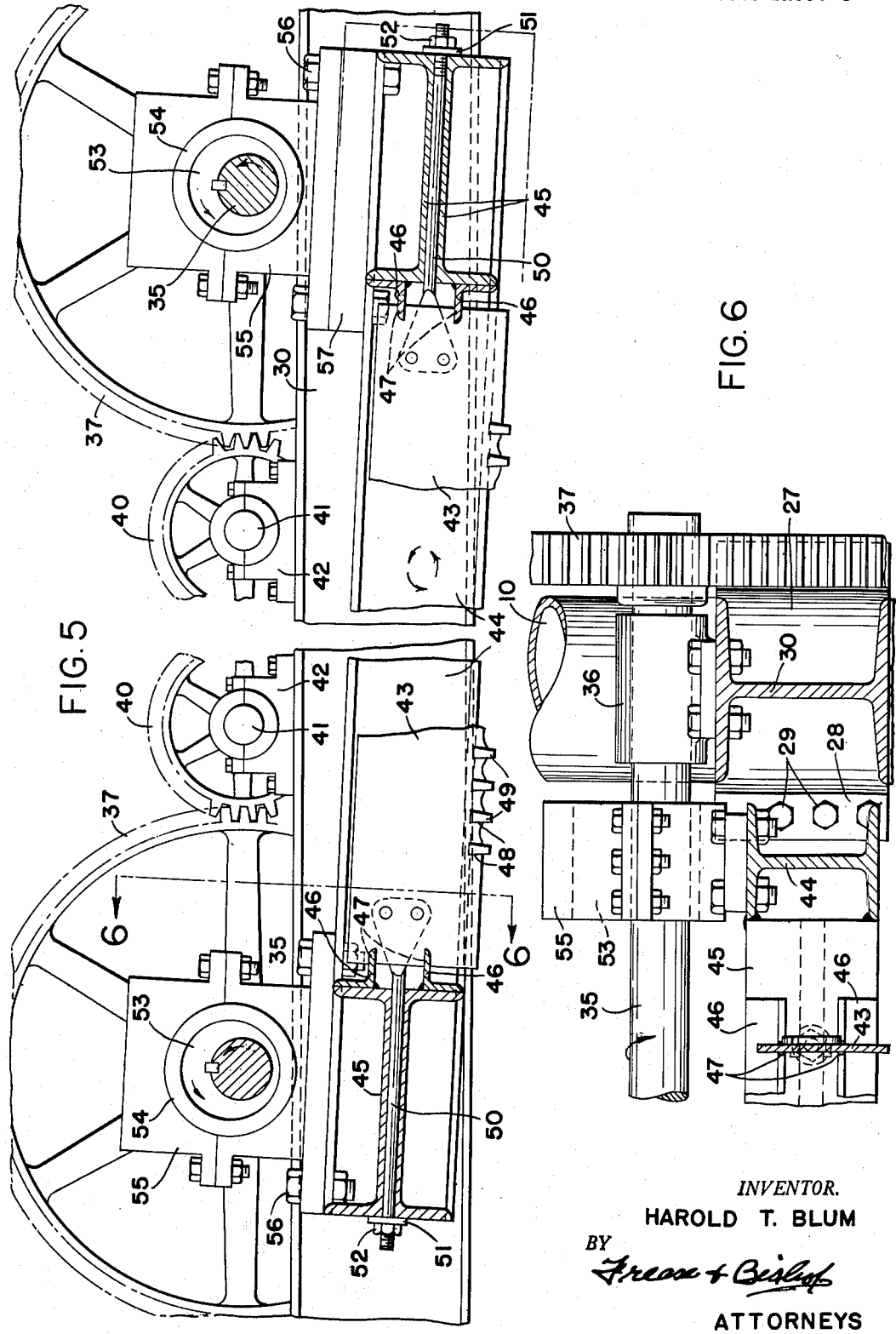

United States Patent Office 2,720,200
Patented Oct. 11, 1955

2,720,200

GANG SAW MACHINE FOR CUTTING STONE

Harold T. Blum, Millersburg, Ohio, assignor to The Briar Hill Stone Company, Glenmont, Ohio, a corporation of Ohio Application December 20, 1954, Serial No. 476,483

14 Claims. (Cl. 125—16)

The invention relates to gang saw machines for cutting blocks of stone into slabs, and the present application is a continuation in part of my copending application, Ser. No. 424,912, filed April 22, 1954, and relates to certain improvements in the driving means for the gang of saws.

In the production of sawed stone, such as limestone, sandstone, marble and granite, for building purposes and the like, the stone is removed from the quarries in huge blocks weighing several tons. These blocks are then taken to the mill where they are cut into slabs of desired thickness.

Under present practice, this operation is accomplished by means of gang saw machines having a swing frame in which is mounted a plurality of saw blades, in the form of plain, smooth edged steel blades.

This swing frame is suspended in the main frame of the machine and arranged to be continuously swung back and forth by means of a pitman, whereby the gang saws move back and forth in an arcuate path. The pitman is driven by a pitman wheel upon a Hurst frame located at some distance from the main frame of the machine.

The block of stone to be cut into slabs is mounted upon a flat car and moved into position below the swing frame which is slowly lowered as the saw blades wear their way into the stone.

An abrasive, such as silica sand or steel shot and water, is continuously delivered beneath the saw blades, causing them to slowly wear into the stone. Owing to the arcuate path in which the saw blades are moved, the stone dust, sludge or cuttings are alternately moved back and forth beneath the saw blades impeding the cutting action thereof.

Such machines therefore cut the stone very slowly, and furthermore they are large and expensive, and take up a considerable amount of floor space in the mill.

In general terms, the invention may be briefly described as comprising a frame consisting of four tubular uprights connected at their upper ends by horizontal structural members, the uprights being spaced apart so that a large block of stone as removed from a quarry may be placed upon the floor between the uprights.

Vertically movable, substantially horizontal structural members are slidably mounted upon the uprights and arranged to be moved vertically by means of vertical feed screws, threaded through said structural members and adapted to be operated in unison by motor driven gearing at the top of the machine. A gang saw frame is supported between the vertically movable structural members and adapted to be reciprocated in a generally circular path to cause the gang saws to form vertical cuts in the block of stone.

In my copending application, Serial No. 424,912, above referred to, the structural members carrying the gang saw frame are shown as inclined slightly to the horizontal, and the gang saw frame is carried thereon by means of a pair of eccentrics mounted on each structural member and connected together by a pitman or connecting rod, separate motors being connected by belts to the eccentrics for rotating the same.

In the instant application, these structural members may be located horizontally and the two eccentrics on each structural member are positively driven in unison by a single motor to which the eccentrics are operatively connected by gears. The gang saw frame may be inclined downwardly and forwardly from the horizontal by means of pillow blocks of differential lengths operatively connecting the gang saw frame to the eccentrics.

It is an object of the present invention to provide a gang saw machine for cutting stone, which will overcome the above-named disadvantages and objections.

Another object is to provide such a machine which is self-contained, comparatively small and will occupy a relatively small amount of floor space.

A still further object of the invention is to provide such a machine in which the gang saws are moved in a circular path so as to move the stone dust, sludge or cuttings in one direction so as to remove them from the cuts in the stone.

Another object is to provide a gang saw machine of the character referred to in which the saw blades are inclined slightly downward in the direction of the movement thereof in contact with the stone.

A further object is to provide such a machine in which the gang saw frame is moved by means of eccentrics.

A still further object is to provide a machine of this character having screw feed means for moving the gang saw frame vertically relative to the main frame of the machine, a relatively slow drive means being provided for the screw feed means for moving the gang saw frame downwardly during the cutting operation, and a relatively fast drive means being provided for raising the gang saw frame after the cutting operation has been completed.

A still further object of the invention is to provide a positive driving means for driving the eccentrics which carry the gang saw frame.

Another object is to provide a single motor connected by gears to both eccentrics on each vertically movable structural member.

A further object is to provide means for supporting the gang saw frame in inclined position suspended from the eccentrics on the horizontal structural members.

Figure 2:
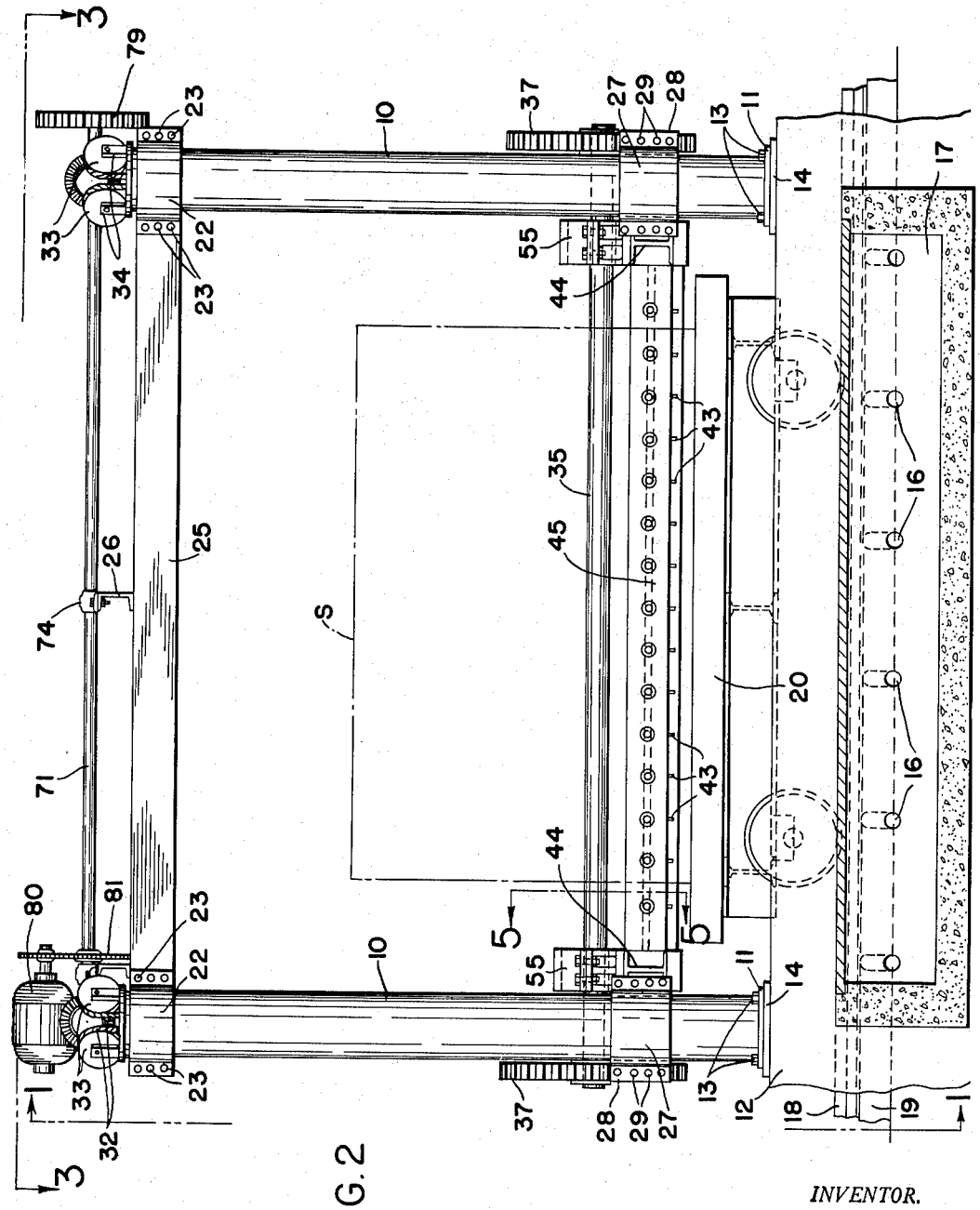
Figures 3, 4:
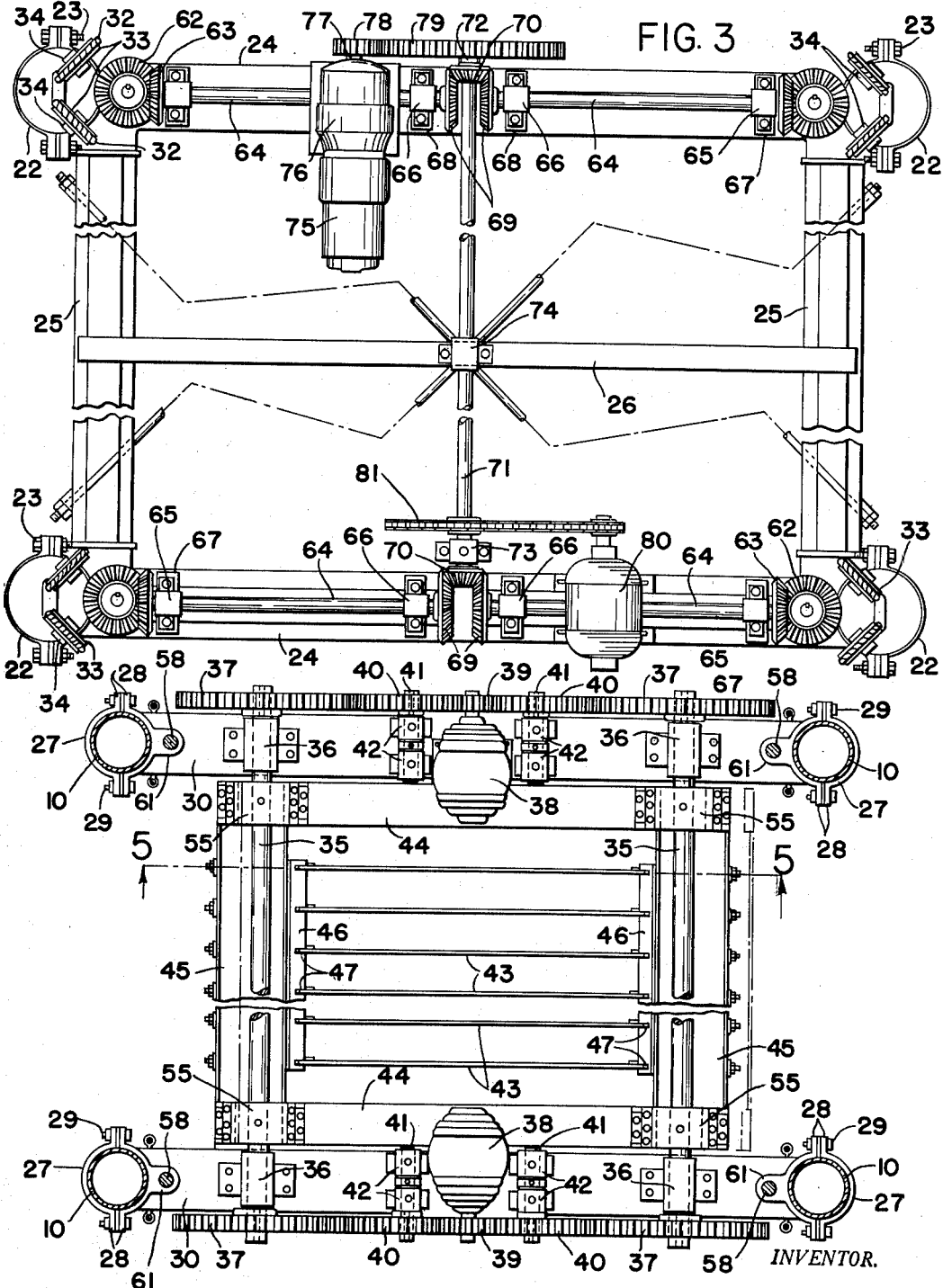

The above and other objects, apparent from the drawings and following description, may be attained, the above described difficulties overcome and the advantages and results obtained, by the apparatus, construction, arrangement and combinations, subcombination and parts which comprise the present invention, a preferred embodiment of which, illustrative of the best mode in which applicant has contemplated applying the principle, being set forth in detail in the following description and illustrated in the accompanying drawings, in which:

Fig. 1 is a side elevation of a gang saw machine embodying the invention, showing the positive drive means for the eccentrics which operate the gang saw frame;

Fig. 2 a rear elevation of the machine;

Fig. 3 a top plan view of the machine, viewed as on the line 3—3, Fig. 2;

Fig. 4 a horizontal, sectional view through the machine, showing the vertically slidable horizontal structural members, the eccentric driving means thereon, and the gang saw frame carried by the eccentrics, taken as on the line 4—4, Fig. 1;

Fig. 5 an enlarged, vertical sectional view through the gang saw frame, showing the eccentrics which support said frame and portions of the positive driving means therefor, taken as on the line 5—5, Figs. 2 and 4; and, Fig. 6 a fragmentary sectional view through one of the vertically slidable horizontal structural members and a portion of the gange saw frame, taken on the line 6—6, Fig. 5.

Referring now to the embodiment of the invention illustrated, in which similar numerals refer to similar parts throughout, the machine may include a main frame consisting of the four tubular corner posts 10, having the flanges 11 at their lower ends, for attachment to a concrete base 12, as by the bolts 13. Plates 14 may be interposed between the lower ends of the uprights 10 and the concrete base, for a purpose to be later described.

A pit 15 may be formed between the uprights 10, extending transversely beneath the machine from one side thereof to the other, and preferably inclined toward the rear side of the machine, so as to drain through the conduit 16 into the tank 17, as shown in Fig. 1.

Transversely disposed track rails 18 are located in the pit 15, being supported upon wooden ties 19 and extending to any desired point at one side of the machine, where a block of stone may be loaded upon the flat car 20, mounted to travel upon the rails.

Any suitable crane or boom may be provided for loading a block of stone upon the car 20, after which it is moved to a point beneath the machine, as shown in Fig. 1, positioning the block of stone as indicated in broken lines at 21, the wheels 21a of the car then being blocked in any conventional manner, so that the car will remain stationary during the sawing operation.

The posts 10 are tied together at their upper ends by means of a rectangular top frame. For this purpose, split flanged collars 22 are clamped upon the upper ends of the posts 10, as by bolts 23, and the top frame is attached to these collars. This top frame comprises horizontally disposed structural members, such as the H-beams 24 and 25 located respectively at opposite sides and at the front and rear of the machine.

These members 24 and 25 may be rigidly attached at their ends to the collars 22 in any suitable manner. For the purpose of further strengthening and bracing the top frame, a transversely disposed channel member 26, or the like, may be welded, bolted or otherwise rigidly attached at its ends to intermediate portions of the H-beams 25, as shown in Figs. 2 and 3.

The cutting of the stone is accomplished by reciprocating gang saws which are vertically adjustable as a unit. For this purpose the gang saw unit is mounted for reciprocation upon a frame slidably mounted upon the posts 10. This frame is shown as provided with sleeves 27 slidably located around the posts 10, each sleeve comprising two similar halves provided with opposed flanges 28 connected together by bolts 29.

At each side of the machine, structural members, such as the H-beams 30, are connected at opposite ends to the corresponding sleeves 27, as best shown in Figs. 1 and 4, thus forming a vertically slidable frame on each side of the machine. These two slidable frames are tied together as will be later described, forming a single, rigid frame mounted for vertical adjustment upon the corner posts 10, and the gang saws are mounted as a unit suspended from this sliding frame for reciprocating motion relative thereto, in the manner hereinafter described in detail.

For the purpose of at least partially counter-balancing the weight of this sliding frame and the gang saw assembly carried thereby, counter-weights 31 may be provided as shown in Fig. 1. These counter-weights are preferably located within the tubular posts 10 within which they may move up and down, without interfering with the operation of the saws.

A pair of cables 32 connects each counter-weight 31 to the sliding sleeve 27 upon the corresponding post 10, these cables extending upward from the sleeve 27 and over the sheaves or pulleys 33 journalled upon brackets 34 at the tops of the posts 10, and then downward within the corresponding posts, to the counter-weight therein.

Transversely disposed shafts 35 extend entirely through the machine, near the front and rear sides thereof, and are journalled in the bearing blocks 36 attached to the upper sides of the structural members 30, thus tying these structural members together in a single vertically movable frame.

Gears 37 are keyed or otherwise secured upon opposite ends of each shaft 35 and the two shafts are arranged to be rotated in unison by means of the motors 38 mounted centrally upon the structural frame members 30.

A pinion 39 is fixed upon the shaft of each motor 37, each pinion meshing on opposite sides with a pair of idler gears 40 mounted upon idler shafts 41 journalled in bearings 42, mounted on the corresponding structural member 30 on opposite sides of the motor 38.

The gang saws 43 are mounted as a unit in a rectangular frame which may comprise the side members 44 in the form of I-beams or the like and the front and back members each comprising a pair of opposed, spaced channel members 45 connected at opposite ends to the side members 44.

An angle member 46 is welded, or otherwise rigidly attached, to the inner surfaces of each of the channel members 45, and provided with a plurality of equally spaced slots 47 receiving the adjacent ends of the saw blades 43.

These saw blades may each comprise a flat strip of steel of suitable dimensions, the lower edge of which is provided with spaced, dove-tail notches 48 within which are located the hardened inserts or teeth of carballoy or the like, as indicated at 49, such as are illustrated and described in detail in my copending application above referred to.

These saw blades are each mounted under tension in the reciprocating frame 44—45 by means of tie bolts 50 attached to opposite ends of the saw blades and located between the spaced channel members 45, washers 51 and nuts 52 being mounted upon the threaded ends of these tie bolts for holding the saw blades under tension within the frame.

For the purpose of reciprocating the entire gang saw unit relative to the vertically movable frame, eccentrics 53 are keyed or otherwise fixed upon opposite end portions of each shaft 35 and received within the eccentric bearings 54 of the pillow blocks 55 which are mounted upon the tops of the I-beams 44 of the gang saw frame, as by the bolts 56.

The gang saw assembly is preferably inclined forwardly and downwardly, and for this purpose shims 57 may be interposed between the pillow blocks 55 and the I-beams 44 at the forward end of the frame, as best shown in Fig. 5. With this construction it will be seen that the gang saw unit will be reciprocated in a substantially circular path as indicated by the arrows in Fig. 5.

The gang saw frame is adapted to be moved vertically by means of feed screws 58 which are located adjacent and parallel to the corner posts 10 and are journalled at their upper ends in bearings 59, mounted upon the top frame members 24, and at their lower ends in thrust bearings 60, mounted upon the bottom plates 14 and threaded through the nuts 61 carried by the collars 27 of the vertically sliding frame.

Thus, by rotation of the feed screws 58, the entire gang saw assembly may be moved downward or upward in the machine as required. Suitable drive means is provided for operating the feed screws 58 in unison and may comprise the bevel pinions 62, fixed upon the upper ends of the feed screws and meshing with the bevel pinions 63 upon the outer ends of the axially aligned shafts 64, journalled in bearings 65 and 66 upon brackets 67 and 68 mounted upon the upper sides of the top frame members 24 near the outer ends and central portions thereof respectively.

The inner ends of each aligned pair of shafts 64 are spaced apart, as best shown in Figs. 1 and 3, and bevel pinions 69 are fixed thereon for meshing with the bevel pinions 70 fixed to opposite ends of the drive shaft 71. This drive shaft is located transversely across the top frame of the machine, opposite ends thereof being journalled in the bearings 72 and 73, mounted upon the corresponding top frame members 24, and in the central bearing 74 mounted upon the channel member 26.

The feed screws 58 are adapted to be rotated at slow speed, in order to slowly move the gang saw assembly downward during the cutting operation by a slow feed drive mechanism which is shown and described in detail in my copending application above referred to.

Briefly, this slow feed drive mechanism comprises a variable speed motor 75 mounted upon one of the top frame members 24, a gear reduction 76 being connected to the motor, the output shaft 77 of the gear reduction having a pinion 78 thereon adapted to mesh with the gear 79 fixed upon the shaft 71.

After the cutting operation has been completed, the slow feed drive mechanism may be disconnected from the shaft 71 and a high speed drive member connected to the shaft 71 for rapidly rotating the feed screws. This high speed drive mechanisms may be driven by the motor 80 mounted upon the top frame at the opposite side of the machine from the slow feed drive mechanism.

The motor 80 is adapted to be optionally connected to the shaft 71 by any suitable means such as the sprocket chain gear 81, any suitable clutch mechanism being interposed therebetween.

In the operation of the machine, a block of stone, as indicated in broken lines at S in Figs. 1 and 2, is placed upon the flat car 20, and with the gang saw unit in raised position, the car is moved into position as shown in Figs. 1 and 2 and the wheels thereof are blocked so as to hold the same against movement.

The motors 38 are then started and through the gearing 39, 40, 37, shafts 35 and eccentrics 53, the gang saw frame will be reciprocated in a circular path, as indicated by the arrows in Fig. 5, the saw blades moving downwardly and forwardly and upwardly and rearwardly.

At the same time the motor 75 of the slow speed drive mechanism is started and the pinion 78 is engaged with the gear 79, and through the shaft 71, pinions 70 and 69, shafts 64 and pinions 63 and 62 the feed screws 58 are slowly rotated in unison in a direction to slowly move the gang saw assembly downward, so that the reciprocating saw blades 43 will cut vertical grooves in the block of stone S.

As the saw blades move in the circular path shown in Fig. 5, it will be seen that the teeth of the saw blades only contact the stone on the downward and forward movement of the blades which are raised out of contact with the stone on the upward and rearward movement.

During this operation, as in usual practice, water is pumped from the tank 17 and onto the top of the block of stone, continually washing the stone cuttings or dust from the grooves being cut in the stone. The water drains back from the stone into the pit 15 and through the conduit 16 to the tank 17, the stone cuttings settling to the bottom of the tank where they may be removed from time to time.

Thus all of the stone dust and cuttings will be continually washed forwardly and downwardly out of the inclined grooves cut into the stone, so that this stone dust and cuttings will not accumulate under the saw blade to impede the cutting action thereof, the teeth of the saw blade contacting directly with the stone, without any film of stone dust or cuttings therebetween.

The saw blades are thus forced into the stone, and the hard inserted teeth in the saw blade will cut the stone in considerably less time than is required by the conventional machine in which a swing frame carrying the gang saws is swung back and forth, the saws exerting a rubbing action and depending on the grit to do the cutting.

The principle of the machine is to cut directly into the stone rather than to wear the stone away as in conventional sawing. Thus the cutting action is much more rapid than in the conventional stone sawing machines.

After the saw blades have cut entirely through the block of stone, severing it into a plurality of slabs of desired thickness, the slow speed drive mechanism is disconnected from the gearing operating the feed screws 58, the high speed drive mechanism is operatively connected thereto, reversing the rotation of the feed screws and rapidly raising the entire gang saw unit above the top of the stone so that the slabs may be removed from the machine by moving the car 20 to a point at one side of the machine.

After the slabs or stone thus cut are removed from the car, another block of stone may be placed thereon and the car moved back to position beneath the machine so that the operation may be repeated.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite end portions of the side members, gears upon opposite ends of said shafts, a motor upon the intermediate portion of each side member, a pinion upon each motor, means operatively connecting each motor pinion to the gears upon the corresponding ends of the shafts, eccentrics upon said shafts, a gang saw frame supported upon said eccentrics, a plurality of spaced saw blades mounted in the gang saw frame, means for positioning a block of stone between said corner posts and beneath said gang saw frame, and means for moving said side members downwardly upon said posts.

2. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite end portions of the side members, gears upon opposite ends of said shafts, a motor upon the intermediate portion of each side member, a pinion upon each motor, idler gears between each motor pinion and the gears upon the corresponding ends of the shafts, eccentrics upon said shafts, a gang saw frame supported upon said eccentrics, a plurality of spaced saw blades mounted in the gang saw frame, means for positioning a block of stone between said corner posts and beneath said gang saw frame, and means for moving said side members downwardly upon said posts.

3. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite end portions of the side members, gears upon opposite ends of said shafts, a motor upon the intermediate portion of each side member, a pinion upon each motor, means operatively connecting each motor pinion to the gears upon the corresponding ends of the shafts, eccentrics upon said shafts, a gang saw frame supported upon said eccentrics, shims located between the forward end of the gang saw frame and the corresponding eccentrics for mounting the gang saw frame in a forwardly and downwardly inclined position, a plurality of spaced saw blades mounted in the gang saw frame, means for positioning a block of stone between said corner posts and beneath said gang saw frame, and means for moving said side members downwardly upon said posts.

4. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite end portions of the side members, gears upon opposite ends of said shafts, a motor upon the intermediate portion of each side member, a pinion upon each motor, idler gears between each motor pinion and the gears upon the corresponding ends of the shafts, eccentrics upon said shafts, a gang saw frame supported upon said eccentrics, shims located between the forward end of the gang saw frame and the corresponding eccentrics for mounting the gang saw frame in a forwardly and downwardly inclined position, a plurality of spaced saw blades mounted in the gang saw frame, means for positioning a block of stone between said corner posts and beneath said gang saw frame, and means for moving said side members downwardly upon said posts.

5. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite end portions of the side members, gears upon opposite ends of said shafts, a motor upon the intermediate portion of each side member, a pinion upon each motor, means operatively connecting each motor pinion to the gears upon the corresponding ends of the shafts, eccentrics upon said shafts, a gang saw frame, pillow blocks upon the top of the gang saw frame, eccentric bearings carried by said pillow blocks and receiving said eccentrics for supporting the gang saw frame upon said eccentrics, a plurality of spaced saw blades mounted in the gang saw frame, means for positioning a block of stone between said corner posts and beneath said gang saw frame, and means for moving said side members downwardly upon said posts.

6. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite ends of said shafts, a motor upon the intermediate portion of each side member, a pinion upon each motor, idler gears between each motor pinion and the gears upon the corresponding ends of the shafts, eccentrics upon said shafts, a gang saw frame, pillow blocks upon the top of the gang saw frame, eccentric bearings carried by said pillow blocks and receiving said eccentrics for supporting the gang saw frame upon said eccentrics, a plurality of spaced saw blades mounted in the gang saw frame, means for positioning a block of stone between said corner posts and beneath said gang saw frame, and means for moving said side members downwardly upon said posts.

7. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite end portions of the side members, gears upon opposite ends of said shafts, a motor upon the intermediate portion of each side member, a pinion upon each motor, means operatively connecting each motor pinion to the gears upon the corresponding ends of the shafts, eccentrics upon said shafts, a gang saw frame, pillow blocks upon the top of the gang saw frame, eccentric bearings carried by said pillow blocks and receiving said eccentrics for supporting the gang saw frame upon said eccentrics, shims located between the forward end of the gang saw frame and the corresponding pillow blocks for mounting the gang saw frame in a forwardly and downwardly inclined position, a plurality of spaced saw blades mounted in the gang saw frame, means for positioning a block of stone between said corner posts and beneath said gang saw frame, and means for moving said side members downwardly upon said posts.

8. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite end portions of the side members, gears upon opposite ends of said shafts, a motor upon the intermediate portion of each side member, a pinion upon each motor, idler gears between each motor pinion and the gears upon the corresponding ends of the shafts, eccentrics upon said shafts, a gang saw frame, pillow blocks upon the top of the gang saw frame, eccentric bearings carried by said pillow blocks and receiving said eccentrics for supporting the gang saw frame upon said eccentrics, shims located between the forward end of the gang saw frame and the corresponding pillow blocks for mounting the gang saw frame in a forwardly and downwardly inclined position, a plurality of spaced saw blades mounted in the gang saw frame, means for positioning a block of stone between said corner posts and beneath said gang saw frame, and means for moving said side members downwardly upon said posts.

9. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite end portions of the side members, gears upon opposite ends of said shafts, a motor upon the intermediate portion of each side member, a pinion upon each motor, means operatively connecting each motor pinion to the gears upon the corresponding ends of the shafts, eccentrics upon said shafts, a gang saw frame supported upon said eccentrics, a plurality of spaced saw blades mounted in the gang saw frame, means for moving said side members downwardly upon said posts, a pit beneath said apparatus, track rails in said pit, and a flat car mounted upon said rails for positioning a block of stone beneath said gang saw frame.

10. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite end portions of the side members, gears upon opposite ends of said shafts, a motor upon the intermediate portion of each side member, a pinion upon each motor, means operatively connecting each motor pinion to the gears upon the corresponding ends of the shafts, eccentrics upon said shafts, a gang saw frame supported upon said eccentrics, a plurality of spaced saw blades mounted in the gang saw frame, means for moving said side members downwardly upon said posts, a pit beneath said apparatus, track rails in said pit, and a flat car mounted upon said rails for positioning a block of stone beneath said gang saw frame, a tank at one side of said pit, and means for draining liquid from the pit into the tank.

11. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite end portions of the side members, gears upon opposite ends of said shafts, a motor upon the intermediate portion of each side member, a pinion upon each motor, idler gears between each motor pinion and the gears upon the corresponding ends of the shafts, eccentrics upon said shafts, a gang saw frame supported upon said eccentrics, a plurality of spaced saw blades mounted in the gang saw frame, means for moving said side members downwardly upon said posts, a pit beneath said apparatus, track rails in said pit, and a flat car mounted upon said rails for positioning a block of stone beneath said gang saw frame.

12. Gang saw apparatus for cutting stone, comprising four upright corner posts, a rectangular top frame connected to the upper ends of the posts, a vertically movable frame comprising side members slidably mounted upon the posts, a pair of shafts journalled at opposite ends upon opposite end portions of the side members, gears upon opposite ends of said shafts, a motor upon the intermediate portion of each side member, a pinion upon each motor, idler gears between each motor pinion and the gears upon the corresponding ends of the shafts, eccentrics upon said shafts, a gang saw frame supported upon said eccentrics, shims located between the forward end of the gang saw frame and the corresponding pillow blocks for mounting the gang saw frame in a forwardly and downwardly inclined position, a plurality of spaced saw blades mounted in the gang saw frame, means for moving said side members downwardly upon said posts, a pit beneath said apparatus, track rails in said pit, and a flat car mounted upon said rails for positioning a block of stone beneath said gang saw frame.

13. Gang saw apparatus for cutting stone, comprising four upright corner posts, means connecting the upper ends of the posts together, a vertically movable frame slidably mounted upon the posts, spaced shafts journalled at opposite ends in said vertically movable frame, gears upon opposite ends of said shafts, a motor upon each side of said vertically movable frame, a pinion on each motor, means operatively connecting each motor pinion to the gears upon the corresponding side of the vertically movable frame, eccentrics upon said shafts, a gang saw frame supported upon said eccentrics, a plurality of spaced saw blades mounted in the gang saw frame, means for positioning a block of stone between said corner posts and beneath said gang saw frame, and means for moving said vertically movable frame downwardly upon said posts.

14. Gang saw apparatus for cutting stone, comprising four upright corner posts, means connecting the upper ends of the posts together, a vertically movable frame slidably mounted upon the posts, spaced shafts journalled at opposite ends in said vertically movable frame, gears upon opposite ends of said shafts, a motor upon each side of said vertically movable frame, a pinion on each motor, idler gears between each motor pinion and the gears upon the corresponding side of the vertically movable frame, eccentrics upon said shafts, a gang saw frame supported upon said eccentrics, a plurality of spaced saw blades mounted in the gang saw frame, means for positioning a block of stone between said corner posts and beneath said gang saw frame, and means for moving said vertically movable frame downwardly upon said posts.

No references cited.